(12) United States Patent
Garg et al.

(10) Patent No.: US 9,977,828 B2
(45) Date of Patent: May 22, 2018

(54) ASSISTED MEMORIZING OF EVENT-BASED STREAMS OF MOBILE CONTENT

(71) Applicant: Evernote Corporation, Redwood City, CA (US)

(72) Inventors: Hemant Garg, Sunnyvale, CA (US); Leonid Kitainik, San Jose, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 357 days.

(21) Appl. No.: 14/037,562

(22) Filed: Sep. 26, 2013

(65) Prior Publication Data
US 2014/0108382 A1 Apr. 17, 2014

Related U.S. Application Data

(60) Provisional application No. 61/714,447, filed on Oct. 16, 2012.

(51) Int. Cl.
*G07F 17/30* (2006.01)
*G06F 17/30* (2006.01)

(52) U.S. Cl.
CPC .. *G06F 17/30699* (2013.01); *G06F 17/30038* (2013.01)

(58) Field of Classification Search
None
See application file for complete search history.

(56) References Cited

U.S. PATENT DOCUMENTS

| 5,377,354 | A | * | 12/1994 | Scannell | H04L 51/22 706/45 |
|---|---|---|---|---|---|
| 5,819,269 | A | * | 10/1998 | Uomini | G06F 17/30722 |
| 5,867,799 | A | * | 2/1999 | Lang | G06F 17/30702 |
| 7,769,767 | B2 | * | 8/2010 | Petersen | G06F 17/30867 707/754 |
| 2005/0060281 | A1 | * | 3/2005 | Bucher | G06F 17/30011 |
| 2006/0080354 | A1 | * | 4/2006 | Berger | G06F 17/30286 |
| 2006/0195850 | A1 | * | 8/2006 | Knight | G06F 9/542 719/318 |

(Continued)

OTHER PUBLICATIONS

U.S. Appl. No. 13/852,293, filed Mar. 28, 2013, Ayzenshtat et al.

*Primary Examiner* — Aleksandr Kerzhner
*Assistant Examiner* — Eddy Cheung
(74) *Attorney, Agent, or Firm* — Morgan, Lewis & Bockius LLP

(57) ABSTRACT

Handling event data received by a mobile device includes filtering out at least a subset of event data based on pre-determined filtering rules, forming groups of event data by grouping at least some of the event data that has not been filtered out based on pre-determined grouping rules, and storing, based on pre-determined auto-filing rules, at least one of: groups of event data and non-filtered event data that is not included with any groups of event data. The event data may include photos, videos, recorded voice notes, phone calls, voice mails, user location data, messaging data, calendar entries, email messages, wireless data transmissions, and/or events scheduled from software applications and online services. The filtering rules may be based on a filtering criteria such as time, location, keyword match, semantic similarity, and/or relations to known events.

24 Claims, 4 Drawing Sheets

(56) References Cited

U.S. PATENT DOCUMENTS

| | | | |
|---|---|---|---|
| 2007/0099657 A1* | 5/2007 | Scott | H04M 1/72552 455/556.2 |
| 2010/0232656 A1* | 9/2010 | Ryu | G06F 17/218 382/118 |
| 2011/0252057 A1* | 10/2011 | Huang | G06F 17/30554 707/770 |
| 2012/0030018 A1* | 2/2012 | Passmore | G06F 17/30702 705/14.52 |
| 2012/0136921 A1* | 5/2012 | Samdadiya | G06F 11/3006 709/203 |
| 2012/0200737 A1 | 8/2012 | Jape et al. | |
| 2013/0212463 A1 | 8/2013 | Pachikov et al. | |

* cited by examiner

ASSISTED MEMORIZING OF EVENT-BASED STREAMS OF MOBILE CONTENT

CROSS-REFERENCE TO RELATED APPLICATIONS

This application claims priority to U.S. Prov. App. No. 61/714,447, filed Oct. 16, 2012, and entitled "METHOD AND SYSTEM FOR ASSISTED MEMORIZING OF EVENT-BASED STREAM OF EXTERNAL MOBILE CONTENT," which is incorporated herein by reference.

TECHNICAL FIELD

This application relates to the fields of acquisition, presentation, processing and storing of multimedia information on mobile devices.

BACKGROUND OF THE INVENTION

Note-taking and other memory assisting software and online services are used by hundreds of millions of people worldwide. By mid-2013, an Evernote memory platform service and software, built by the Evernote Corporation of Redwood City, Calif., counted alone over 60M users and is adding millions of new users each month. Major application stores for Android, iOS, Mac and Windows platforms carry over 600 note-taking software titles aimed at memorizing diverse types of information.

One of the fast growing key trends in digital note-taking and in personal information management (PIM) as a whole is multi-platform content accessibility. This is particularly true for mobile devices, such as smartphones and tablets. Thus, according to usage statistics published by Evernote, over 75% of users have been creating and viewing their information on two or more platforms, of which at least one was represented by a mobile device. Analogously, most new users of the Dropbox, Inc.'s distributed storage service arrive from mobile devices.

Note-taking is defined by some sources as the "practice of recording information captured from another source". With constantly growing multimedia capabilities of mobile devices, including smartphones, tablets and emerging wearable gadgets, information sources captured and memorized in personal databases on mobile devices vs. desktop computers are quite different from each other. An explosive growth of mobile usage has led to significant expansion of data types that can be instantly captured by users and then memorized, as necessary, in their personal databases. External streams of mobile content arrive to a mobile device in multiple ways, such as incoming voice calls and voicemails, photos taken by embedded cameras, messages, notifications, images and other content arriving via messaging, social and online applications and services, user destinations captured by location-aware devices, actions scheduled by software and online sources. Capturing external streams is described in Published U.S. Patent Application No. US20130212463 titled: "SMART DOCUMENT PROCESSING WITH ASSOCIATED ONLINE DATA AND ACTION STREAMS", filed on Oct. 31, 2012 by Pachikov, et al. and incorporated by reference herein, etc. Smartphones and some categories of wearable devices are also capable of generating, displaying and processing traditional PIM events, such as scheduled meetings from user calendars and emails; therefore, such external events may also be present on mobile devices. Additionally, life logging with wearable computers and video cameras gradually makes its way into a modern lifestyle; in the meantime, smartphones are increasingly used for life logging activities, which may have both personal and social networking components.

Irrespective of sources, capturing methods, and hardware options utilized for obtaining external mobile content, users may like to memorize portions of such content flowing through their mobile devices. They would also like to see such content in the appropriate context, side-by-side with other content and notes taken on different devices.

Notwithstanding growing user capabilities to access multimedia content on their mobile devices, existing software applications and methods for recording different media types are under-developed and limited in scope. Content capturing options are scattered between different sources of mobile content, use disparate storage options and have no mechanisms allowing association of new data with the previously stored information. User capabilities to set up meaningful and customizable recording criteria allowing selective recording of an external content in association with user's previous experiences are not readily available and in many cases such customization is impossible.

Accordingly, it is desirable to provide advanced methods and systems for assisted memorizing of external mobile content.

SUMMARY OF THE INVENTION

According to the system described herein, handling event data received by a mobile device includes filtering out at least a subset of event data based on pre-determined filtering rules, forming groups of event data by grouping at least some of the event data that has not been filtered out based on pre-determined grouping rules, and storing, based on pre-determined auto-filing rules, at least one of: groups of event data and non-filtered event data that is not included with any groups of event data. The event data may include photos, videos, recorded voice notes, phone calls, voice mails, user location data, messaging data, calendar entries, email messages, wireless data transmissions, and/or events scheduled from software applications and online services. The filtering rules may be based on a filtering criteria such as time, location, keyword match, semantic similarity, and/or relations to known events. The filtering rules may be based on at least two of the filtering criteria that are logically combined. Handling event data received by a mobile device may also includes discarding at least some of the groups of event data and non-filtered event data that is not included with any groups of event data that are not stored based on the auto-filing rules. The discarding may be performed periodically or may be performed in response to more than a predetermined amount of event data being stored in a memory of the mobile device that is used to store groups of event data and non-filtered event data that is not included with any groups of event data. The grouping rules may be based on people, location, and/or timing. Groups of event data and non-filtered event data that is not included with any groups of event data may be associated with data that had previously been stored. The groups of event data and non-filtered event data that is not included with any groups of event data may be presented to a user along with the data that had previously been stored and is associated with the said event data. The user may determine whether to store event data presented to the user, discard event data presented to the user, or store a modified version of the data that corresponds to a combination of the groups of event data and non-filtered event data that is not included with any groups of event data and the data that had previously been stored. The mobile device includes software that is pre-loaded with the device, installed from an app store, and/or downloaded from a Web site. The mobile device may use an operating system such as iOS, Android OS, Windows Phone OS, Blackberry OS and mobile versions of Linux OS.

According further to the system described herein, computer software, provided in a non-transitory computer-readable medium, handles event data received by a mobile device. The software includes executable code that filters out at least a subset of event data based on pre-determined filtering rules, executable code that forms groups of event data by grouping at least some of the event data that has not been filtered out based on pre-determined grouping rules, and executable code that stores, based on pre-determined auto-filing rules, at least one of: groups of event data and non-filtered event data that is not included with any groups of event data. The event data may include photos, videos, recorded voice notes, phone calls, voice mails, user location data, messaging data, calendar entries, email messages, wireless data transmissions, and/or events scheduled from software applications and online services. The filtering rules may be based on a filtering criteria such as time, location, keyword match, semantic similarity, and/or relations to known events. The filtering rules may be based on at least two of the filtering criteria that are logically combined. The computer software may also include executable code that discards at least some of the groups of event data and non-filtered event data that is not included with any groups of event data that are not stored based on the auto-filing rules. The discarding may be performed periodically or may be performed in response to more than a predetermined amount of event data being stored in a memory of the mobile device that is used to store groups of event data and non-filtered event data that is not included with any groups of event data. The grouping rules may be based on people, location, and/or timing. Groups of event data and non-filtered event data that is not included with any groups of event data may be associated with data that had previously been stored. The groups of event data and non-filtered event data that is not included with any groups of event data may be presented to a user along with the data that had previously been stored and is associated with the said event data. The user may determine whether to store event data presented to the user, discard event data presented to the user, or store a modified version of the data that corresponds to a combination of the groups of event data and non-filtered event data that is not included with any groups of event data and the data that had previously been stored. The software may be pre-loaded with the device, installed from an app store, and/or downloaded from a Web site. The mobile device may use an operating system such as iOS, Android OS, Windows Phone OS, Blackberry OS and mobile versions of Linux OS.

The proposed system registers streams of external events and content on a mobile device, filters and optionally groups external events according to grouping rules in a temporary candidate memory, auto-files portion of candidate memories in content collections of a user, associates the rest of candidate memories with relevant previous memories from the content collection and presents the memories and the associated materials to the user who may then choose to file some of the presented candidate memories in the content collections and discard the rest of the candidate memories. The system enables the user to define and customize many types of criteria: filtering, grouping, auto-filing and association rules based on parameters of the external events and content, or retain the predefined rules.

Sources of mobile content and event streams may be driven by the device, network and infrastructure capabilities, by user interests and communications with others, by features of content management system and content collections memorized by the user, and by other factors. The events and related content may include, but are not limited to, the following types:

Photos and videos taken by mobile cameras.

Recorded voice notes and replays of portions of audio content.

Incoming and outgoing phone calls and voicemails.

User locations detected by diverse location-aware technologies such as GPS.

Communications received in different formats and from different applications, including instant messaging, such as SMS, and WhatsApp, WeChat, KakaoTalk, Skype, Kik Messenger, Viber, etc.

Calendar entries, including scheduled and upcoming meetings, birthdays and other recorded future events, as well as related notifications and reminders.

Incoming emails and related notifications.

Incoming and outgoing data transmissions via NFC, Bluetooth, Wi-Fi and other short-range wireless technologies.

Action results from functioning of automatic or semi-automatic action notes present in content collections of a user.

Events scheduled in other software applications and online services, for example, push notifications such as fitting price notifications by a price comparison engine or a stock tracker.

Some of the events, for example, outgoing communications, data and message sending or photographing, may be proactively initiated by a mobile user; other events, such as incoming communications, may be independent of initiation by a user.

Streams of mobile events from various sources may be categorized and processed by a filtering engine, which determines a preliminary noteworthiness of each event based on predefined and/or user-defined rules. The rules may be based on one or more of time, location, keyword match, semantic similarity, relations to known events, etc. For example:

Keep as noteworthy all photos taken by my phone camera on weekends at home and in a nearby park.

Keep as noteworthy all scheduled meetings with Jim and Mary and all instant messages from them.

Keep as noteworthy all emails relevant to my recorded phone call with John of Apr. 23, 2013 (a text version of the phone call may be manually transcribed or converted via speech recognition and relevance of incoming emails may be estimated based on a semantic similarity metrics).

Basic rules may be combined into composite rules using Boolean expressions as shown in the first two examples above.

External events that do not satisfy filtering rules may be considered non-noteworthy and may be immediately discarded. Noteworthy external events may be further assessed by the grouping engine, i.e. a set of grouping rules with the purpose of creating event assemblies in temporary candidate memories on the device. The candidate memories may be periodically cleared, as explained elsewhere herein, and content of the candidate memories may be either memorized in content collections of a user or discarded. After the candidate memories have been cleared, the first incoming external event deemed noteworthy by the filtering engine may be immediately recorded among the candidate memories. Every subsequent noteworthy event may be evaluated for possible grouping with previously recorded events in the candidate memories. If such new external event satisfies the grouping rules the new external event may be added to a previously created group or may be combined with a singular previously recorded event to form a new group.

Grouping rules may be closely related to filtering rules or may be defined by other considerations. For example, a grouping rule such as:

Group together all calendar meeting events where Jim and Mary are among meeting participants and all instant messages from Jim and Mary is closely related to the second of the sample filtering rules explained elsewhere herein. In contrast, the following two examples of grouping rules:

Group together all photos taken by verified meeting participants during a noteworthy calendar meeting; and Group together all photos taken at the same location when time interval between subsequent photos is less than 15 minutes are defining a different grouping logic wherein external events are assembled with respect to non-filtering occurrences based on people location and timing.

If grouping with previously recorded events in the candidate memories is not justified, the new external noteworthy event may be added to the candidate memories as a singular item.

The candidate memories contain groups and ungrouped noteworthy events with the intent to subsequently memorize some or all of the groups and ungrouped noteworthy events in permanent individual, shared or business wide user content collections. At certain times, candidate memories may be assessed; part of the events stored therein may be memorized in permanent content collections and a remainder of the events may be dropped to free up storage space for data corresponding to the ongoing streams of external events on the mobile device. The choice of assessment times may be driven by the accumulated size of the candidate memories, by the time period lapsed since the start of the current accumulating period and by other factors. At the start of assessment, a set of auto-filing rules may be applied to the content of the candidate memories. Auto-filing rules may determine important events and groups of events that may be filed permanently without a user review. For example:

Auto-file all events occurring through August-October and related to Project X.

Auto-file all events with messages from employee N.

Auto-file all photos taken during weekend.

After all noteworthy events from the candidate memories satisfying the auto-filing rules have been memorized in the content collections, the system presents the remaining portion of the candidate memories (if any are left) to the user. Prior to displaying the events, the system may build associations between the external events and materials in existing content collections using a set of association rules, which may be user-defined, predefined or combined, as explained elsewhere herein. Association rules may be based on semantic similarity, locations, time, people, etc.

New events and associated items from content collection may be displayed to the user. Related items are described, for example, in U.S. patent application Ser. No. 13/852,283 titled: "RELATED NOTES AND MULTI-LAYER SEARCH IN PERSONAL AND SHARED CONTENT", filed on Mar. 28, 2013 by Ayzenshtat, et al. and incorporated by reference herein. Related items give the user a context and history to help deciding on the necessity and details of filing of new events. Depending on user assessment of new external events from the candidate memories and the associated items from the content collections, the decision may be to discard some or all individual or grouped events presented to the user, to file the events as separate items to the content collections, to add the events to existing items, such as, for example, recently auto-filed external events, etc.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for filtering, aggregating, accumulating and memorizing streams of external events on mobile devices, such as smartphones, tablets, smart glasses, other wearable devices, etc. Events may be instantly discarded or declared noteworthy based on a set of filtering rules. Noteworthy events may be subsequently aggregated based on a set of grouping rules. A portion or all of the accumulated noteworthy events and groups of events may be automatically filed to user content collection(s) based on auto-filing rules. Other noteworthy events may be associated with existing items from the content collections and presented to the user who may decide to discard of file the events to content collections, individually or merged with other items.

Figure 1:
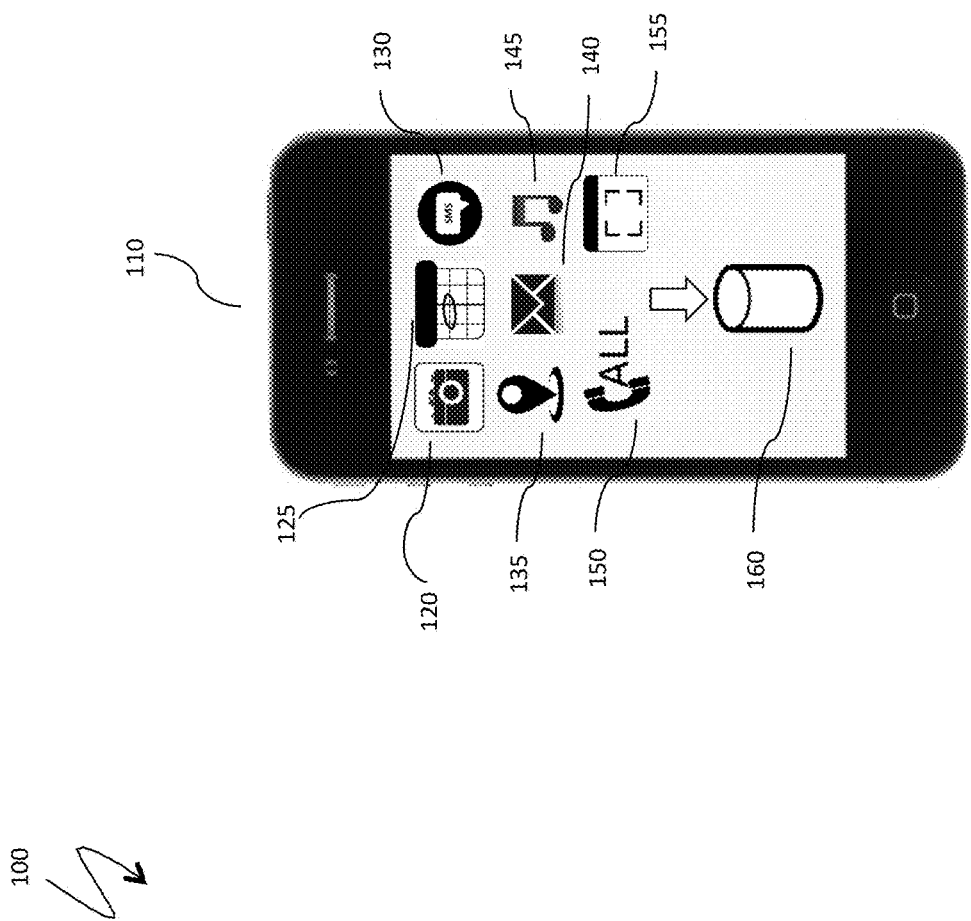
FIG. 1 is a schematic illustration of different classes of external events that may arrive to a mobile device of a user, according to embodiments of the system described herein.

FIG. 1 is a schematic illustration 100 of different classes of external events that may arrive to a mobile device 110 of a user. The mobile device 110 may be a conventional hand-held smartphone miming one of several major mobile platforms, including iOS, Android, Windows Phone OS, Blackberry OS and mobile versions of Linux. The mobile device runs additional user software (e.g., an app or application) that provides the functionality described herein. The user software may be bundled (pre-loaded), installed from an app store or downloaded from a Web site.

Events are schematically depicted on a screen of the mobile device 110 via application or data type icons and include a photographing event 120, a scheduling event 125, an instant mobile messaging event 130, a location changing event 135, an email event 140, an audio replay event 145, a phone call 150, and a browser feedback event 155. The sample list of events in FIG. 1 is not necessarily all-inclusive and is presented for the purpose of illustration and in conjunction with an application potentially running on the mobile device 110. A content collection 160 is schematically shown on the illustration 100 as a filing destination in conjunction with memorizing the external events.

Figure 2:
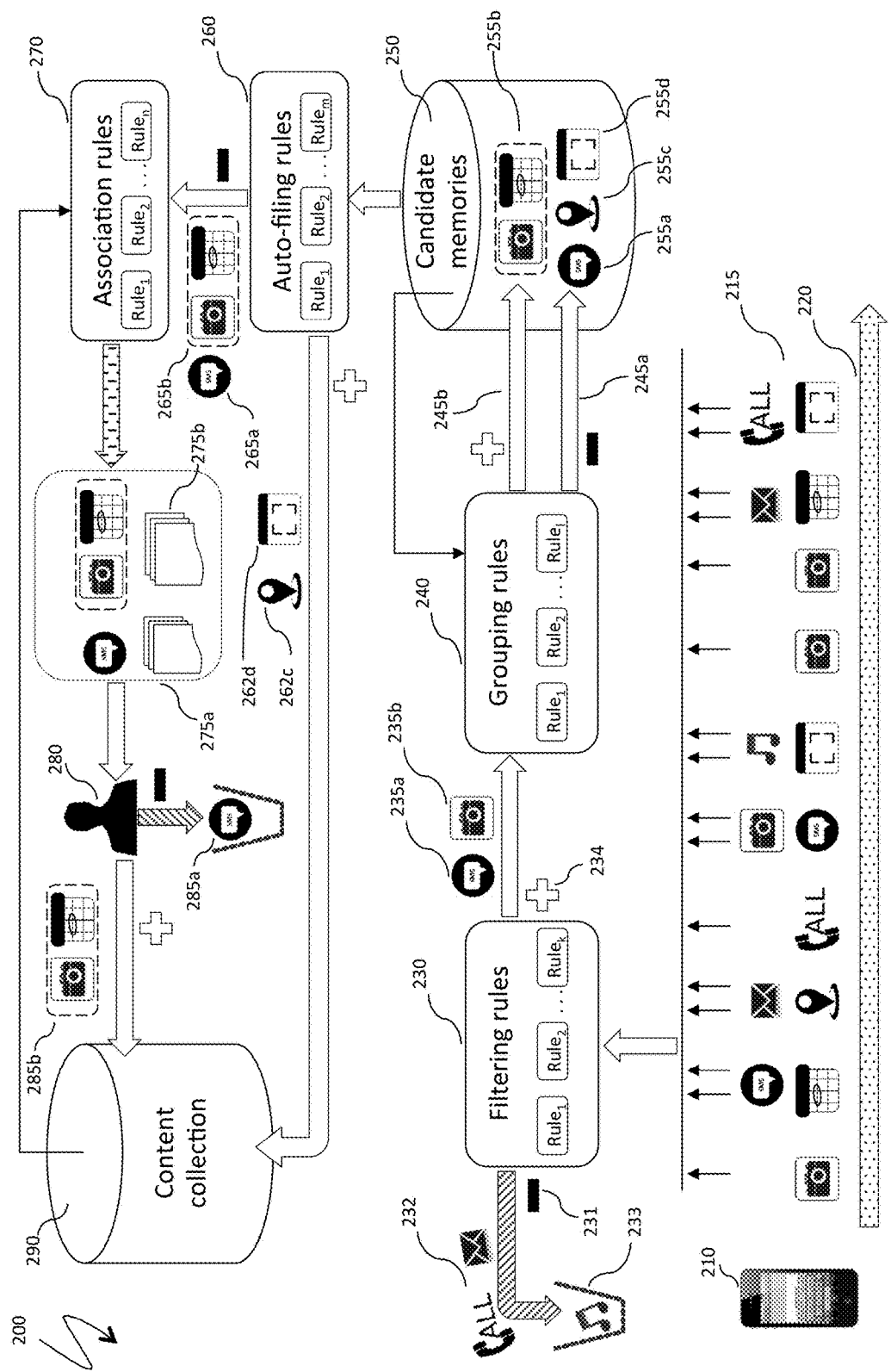
FIG. 2 is a system architecture chart, according to embodiments of the system described herein.

FIG. 2 is a system architecture chart 200 showing diverse phases of event processing and related information flow. A mobile device 210 receives a stream of external events 215 ordered by time as schematically shown by a timeline arrow 220. Upon arrival, events are processed by a filtering engine 230 that includes one or several filtering rules $Rule_1, \ldots, Rule_k$ defining noteworthiness of the events.

Events rejected by the filtering rules, as schematically shown by a minus sign 231 (which is also used elsewhere on the chart), are instantly deleted; the rejected events form a stream 232 of events discarded on entry, as schematically illustrated by a trash bin 233, which is also used elsewhere on the illustration 200. Noteworthy external events that filter through the module 230, as schematically shown by a plus sign 234 (the plus sign 234 is also utilized elsewhere on the chart), form a stream of incoming noteworthy events 235a, 235b.

New incoming noteworthy events are directed to a grouping engine 240 that includes one or more rules $Rule_1, \ldots, Rule_l$ for combining the current incoming event with other noteworthy events already present among candidate memories 250 on the device, as schematically shown by a thin arrow connecting the candidate memories 250 with the grouping engine 240. If the result of application of grouping rules is negative, as schematically shown by an arrow 245a, then the corresponding event is added to candidate memories as a singular item 255a representing the incoming noteworthy event 235a. Otherwise, an arrow 245b indicates an alternative path where an incoming event is grouped with pre-existing event(s) in the candidate memories, as illustrated by a group 255b, which absorbs an incoming noteworthy event 235b.

Candidate memories are periodically flashed, as explained elsewhere herein. At the start of a flashing process, accumulated candidate memories may be assessed by one or more auto-filing rules 260 to determine if some or all of the current candidate memories may be stored with user content collection(s) without being presented to the user. Events that satisfy auto-filing rules may be immediately memorized in a permanent content collection 290, as illustrated by a stream of events 262c, 262d. Auto-filed events 262c, 262d may also be deleted from the candidate memories.

For candidate memories that do not satisfy auto-filing rules, as illustrated by the minus sign 231 and the candidate memories 265a, 265b. The candidate memory 265a is a single event while the candidate memory 265b is a group of two events. The system builds associated memories from the content collection. To this end, the system employs an association engine 270 containing one or several association rules, which scan the existing content collections, as illustrated by an arrow connecting the content collection 290 with the association engine 270, and builds a set of associated items for each candidate memory. An output of the association engine contains the candidate memories and the sets of associated notes for each of the memory events or groups of events, illustrated by a pair of sets 275a, 275b. The output of the association engine is presented to a user 280 who assesses the information and decides which of the candidates memories may be discarded, as illustrated by an item 285a, and which may be filed to the content collections, as schematically shown by an item 285b. The user may also decide how to file appropriate noteworthy events, which may be filed individually, combined with associated items, etc. Events that are discarded or saved to the content collections may be deleted from candidate memories. The user may also decide to keep certain noteworthy events in the candidate memories waiting until additional incoming events clarify the status of the events rather than instantly discarding or saving the events. This is not shown on the illustration 200.

Figure 3:
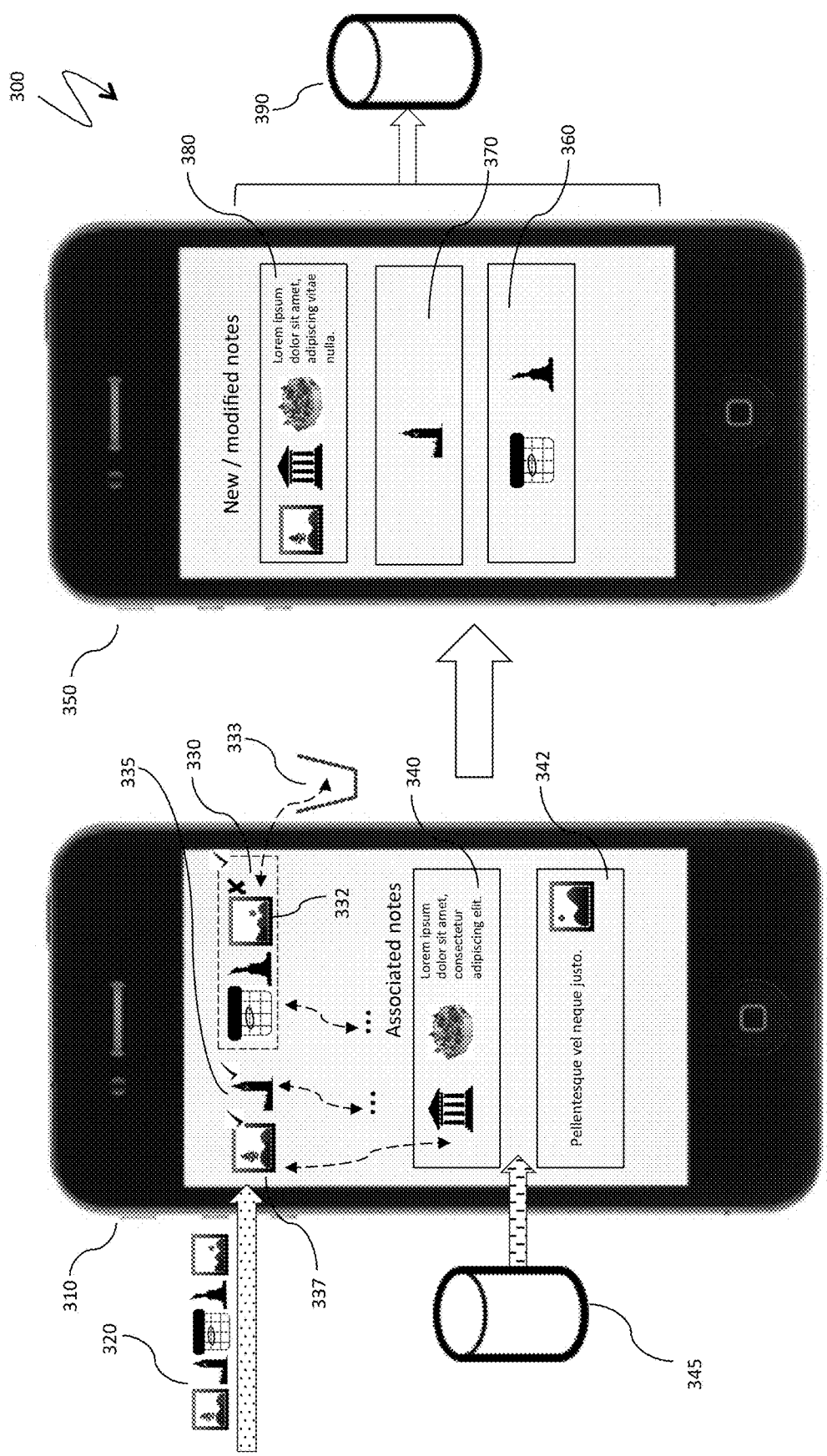
FIG. 3 schematically illustrates a user decision process and a user interface with respect to memorizing external events, according to embodiments of the system described herein.

FIG. 3 is a schematic illustration 300 of a user decision process and user interface with respect to memorizing external events. A mobile device 310 receives an incoming stream of external events 320. The assumptions for the illustration 300 are that (a) all events 320 are passing filtering rules without deletion; (b) the events are grouped within the candidate memories as shown and explained in the following text; and (c) the candidate memories that represent the events 320 are not auto-filed and cause the system to present the events to the user, along with associated items from content collection(s). Specifically, three events from the incoming stream 320 are grouped to create an aggregate candidate memory 330, while two other items form individual candidate memories 335, 337. The system builds associated memories 340, 342 from a content collection 345 and presents the candidate memories and the associated memories to the user. Other associated memories may be accessible by scrolling down the screen of mobile device 310. In the example of FIG. 3, the user decides to delete an event 332 from the aggregate candidate memory 330, as schematically shown by a cross mark near an item 332 and a dashed arrow leading to a trash bin 333. Subsequently, the user files the remaining candidate memories as follows: the modified aggregate memory 330 and an individual candidate memory 335 are filed as separate items to the content collection, while an individual candidate memory 337 is merged with the associated item 340. The result of user actions is illustrated by a modified device screen 350 where permanent memories 360, 370, 380 depict the user choice. The two new memories 360, 370 and the modified memory 380 (which includes the associated memory 340 and the individual candidate memory 337) are subsequently filed to the content collection 390.

Figure 4:
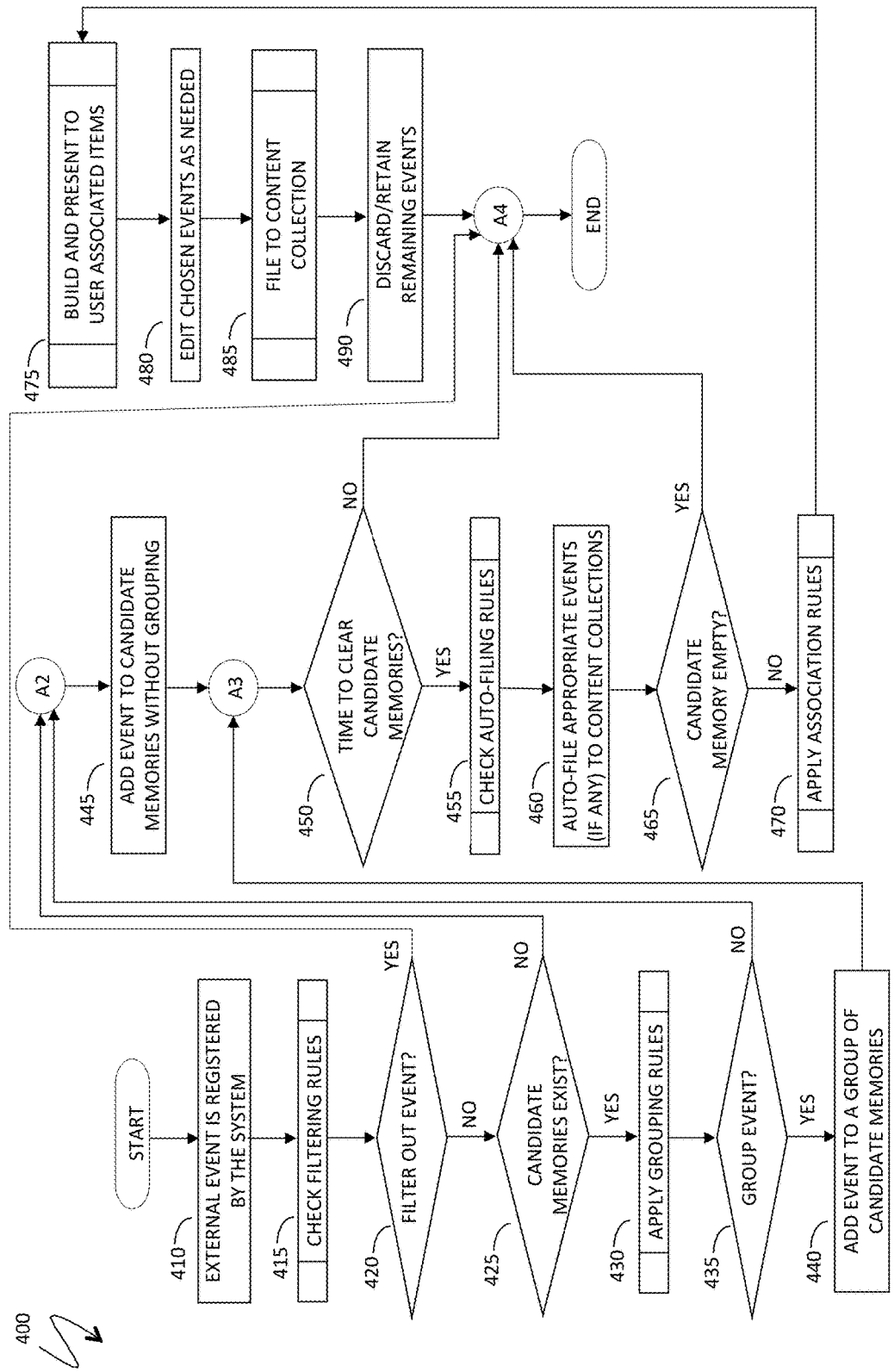
FIG. 4 is a system flow diagram that describes processing associated with different embodiments of the system described herein.

Referring to FIG. 4, a flow diagram 400 explains processing in conjunction with receiving, processing and filing external events on a mobile device while the device is tracking mobile events. Processing starts at a step 410 where an external mobile event is registered by the system. After the step 410, processing proceeds to a step 415, where the system checks filtering rules for the new event. After the step 415, processing proceeds to a test step 420, where it is determined whether the event is filtered out. If so, then processing is complete; otherwise, the incoming event is deemed noteworthy and processing proceeds to a test step 425 where it is determined whether candidate memories currently exist (or they have just been cleared and the set is empty). If so (if candidate memories exist), then processing proceeds to a step 430 where the system applies grouping rules to the noteworthy event and to the current candidate memories, as explained elsewhere herein. See, for example, the system architecture chart 200. After the step 430, processing proceeds to a test step 435 where it is determined whether the current event is grouped. If so, processing proceeds to a step 440 where the incoming noteworthy event is added to a group of candidate memories to form a larger aggregated group.

If it is determined at the test step 425 that the candidate memories do not exist or if it is determined at the test step 435 that the current event is not grouped, control transfers to a step 445 where the incoming noteworthy event is added to the existing set of candidate memories. Note that if no candidate memories exist, the set of candidate memories at the step 445 may be an empty set. Following the step 445 or the step 440 is a test step 450 where it is determined whether it is time to clear candidate memories. If not, processing is complete; otherwise, processing proceeds to a step 455 where the system applies auto-filing rules to individual and aggregate candidate memories. After the step 455, processing proceeds to a step 460 where the system auto-files the candidate memories that satisfy auto-filing rules (if any) to permanent content collections. Filed events may be deleted from the current set of candidate memories.

After the step 460, processing proceeds to a test step 465 where it is determined whether the candidate memory has been cleared by auto-filing. If so, processing is complete; otherwise, processing proceeds to a step 470 where the system applies association rules to the remaining set of candidate memories. After the step 470, processing proceeds to a step 475 where the system builds and presents to the user a set of associated items from the existing content collections. After the step 475, processing proceeds to a step 480 where the user chooses and edits chosen candidate memories and events constituting the memories, as explained elsewhere herein. See, for example, the illustration 300 explaining user options and interface. After the step 480, processing proceeds to a step 485 where the potentially modified candidate memories are filed to user content collection(s). After the step 485, processing proceeds to a step 490 where the rest of candidate memories is either discarded or retained for further clarifications, as explained elsewhere herein. After the step 490, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, although other devices are also possible. Note that the system described herein may work with a desktop, a laptop, and/or any other computing device in addition to a mobile device.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of handling event data received by a mobile device, comprising:
    obtaining the event data from a plurality of applications;
    generating a filtered set of event data by filtering out, from the event data, at least a subset of the event data based on pre-determined filtering rules that are independent of any pre-determined grouping rules;
    determining whether grouping candidate event data exists in the filtered set of event data;
    in accordance with a determination that grouping candidate event data exists in the filtered set of event data, applying the pre-determined grouping rules to the filtered set of event data to generate one or more groups within the filtered set of event data; and
    in accordance with a determination that grouping candidate event data does not exist in the filtered set of event data, foregoing applying the pre-determined grouping rules to the filtered set of event data;
    applying pre-determined auto-filing rules to the filtered set of event data, wherein the pre-determined auto-filing rules:
        automatically store a first portion of the filtered set of event data; and
        generate a remainder set of event data from a second portion of the filtered set of event data, different from the first portion of the filtered set of event data, wherein the second portion of the filtered set of event data is not automatically stored,
        wherein the pre-determined auto-filing rules are separate from the pre-determined grouping rules, and
        wherein the pre-determined auto-filing rules are not applied until after the pre-determined grouping rules are applied; and,
    displaying, on a display of the mobile device, a user interface that displays content that corresponds to one or more events of the remainder set of the event data, wherein the content that corresponds to the one or more events of the remainder set of the event data includes grouped content that corresponds to at least one of the one or more groups within the filtered set of data.

2. A method, according to claim 1, wherein the event data include at least one of: photos, videos, recorded voice notes, phone calls, voice mails, user location data, messaging data, calendar entries, email messages, wireless data transmissions, and events scheduled from software applications and online services.

3. A method, according to claim 1, wherein the pre-determined filtering rules are based on at least one filtering criteria selected from the group consisting of: time, location, keyword match, semantic similarity, and relations to known events.

4. A method, according to claim 3, wherein the pre-determined filtering rules are based on at least two of the filtering criteria that are logically combined.

5. A method, according to claim 1, further comprising:
    discarding at least one of the one or more groups within the filtered set of event data based on the auto-filing rules.

6. A method, according to claim 5, wherein discarding is performed periodically.

7. A method, according to claim 5, wherein discarding is performed in response to more than a predetermined amount of event data being stored in a portion of the memory of the mobile device that is used to store the filtered set of event data.

8. A method, according to claim 1, wherein the pre-determined grouping rules are based on at least one of: people, location, and timing.

9. A method, according to claim 1, wherein the mobile device includes software that is one of: pre-loaded with the device, installed from an app store, and downloaded from a Web site.

10. A method, according to claim 1, wherein the mobile device uses an operating system selected from the group consisting of: iOS, Android OS, Windows Phone OS, Blackberry OS and mobile versions of Linux OS.

11. A method, according to claim 1, including:
detecting user input for at least one of:
storing first data from the remainder set of the event data;
deleting second data from the remainder set of the event data; or
grouping third data from the remainder set of the event data with previously stored event data.

12. A method, according to claim 1, wherein determining whether grouping candidate event data exists in the filtered set of event data includes determining whether the filtered set of event data includes data that corresponds to at least one event.

13. Computer software, provided in a non-transitory computer-readable medium, that handles event data received by a mobile device, the software comprising:
executable code that obtains the event data from a plurality of applications;
executable code that generates a filtered set of event data by filtering out, from the event data, at least a subset of the event data based on pre-determined filtering rules that are independent of any pre-determined grouping rules;
executable code for determining whether grouping candidate event data exists in the filtered set of event data;
executable code that, in accordance with a determination that grouping candidate event data exists in the filtered set of event data, applies the pre-determined grouping rules to the filtered set of event data to generate one or more groups within the filtered set of event data; and
executable code that, in accordance with a determination that grouping candidate event data does not exist in the filtered set of event data, forgoes applying the pre-determined grouping rules to the filtered set of event data;
executable code that applies pre-determined auto-filing rules to the filtered set of event data, wherein the pre-determined auto-filing rules:
automatically store a first portion of the filtered set of event data; and
generate a remainder set of event data from a second portion of the filtered set of event data, different from the first portion of the filtered set of event data, wherein the second portion of the filtered set of event data is not automatically stored,
wherein the pre-determined auto-filing rules are separate from the pre-determined grouping rules, and
wherein the pre-determined auto-filing rules are not applied until after the pre-determined grouping rules are applied; and,
executable code for displaying, on a display of the mobile device, a user interface that displays content that corresponds to one or more events of the remainder set of the event data, wherein the content that corresponds to the one or more events of the remainder set of the event data includes grouped content that corresponds to at least one of the one or more groups within the filtered set of data.

14. Computer software, according to claim 13, wherein the event data include at least one of: photos, videos, recorded voice notes, phone calls, voice mails, user location data, messaging data, calendar entries, email messages, wireless data transmissions, and events scheduled from software applications and online services.

15. Computer software, according to claim 13, wherein the pre-determined filtering rules are based on at least one filtering criteria selected from the group consisting of: time, location, keyword match, semantic similarity, and relations to known events.

16. Computer software, according to claim 15, wherein the pre-determined filtering rules are based on at least two of the filtering criteria that are logically combined.

17. Computer software, according to claim 13, further comprising:
executable code that discards at least one of the one or more groups within the filtered set of event data some of the groups of event data and non-filtered event data that is not included with any groups of event data that are not stored based on the auto-filing rules.

18. Computer software, according to claim 17, wherein discarding is performed periodically.

19. Computer software, according to claim 17, wherein discarding is performed in response to more than a predetermined amount of event data being stored in a portion of the memory of the mobile device that is used to store the filtered set of event data.

20. Computer software, according to claim 13, wherein the pre-determined grouping rules are based on at least one of: people, location, and timing.

21. Computer software, according to claim 13, wherein the software is one of: pre-loaded with the mobile device, installed from an app store, and downloaded from a Web site.

22. Computer software, according to claim 13, wherein the mobile device uses an operating system selected from the group consisting of: iOS, Android OS, Windows Phone OS, Blackberry OS and mobile versions of Linux OS.

23. Computer software, according to claim 13, including:
executable code for detecting user input for at least one of:
storing at least a portion of the remainder set of the event data;
deleting at least a portion of the remainder set of the event data; or
grouping at least a portion of the remainder set of the event data with previously stored event data.

24. Computer software, according to claim 13, wherein determining whether grouping candidate event data exists in the filtered set of event data includes determining whether the filtered set of event data includes data that corresponds to at least one event.

* * * * *